(12) United States Patent
Walker et al.

(10) Patent No.: US 7,894,597 B2
(45) Date of Patent: Feb. 22, 2011

(54) CATEGORIZATION OF TELEPHONE CALLS

(75) Inventors: Jennifer Walker, Jackson, WY (US);
Vinod Katkam, San Jose, CA (US);
Randall B. Baird, Austin, TX (US);
Cullen Jennings, San Jose, CA (US);
Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1429 days.

(21) Appl. No.: 11/249,840

(22) Filed: Oct. 12, 2005

(65) Prior Publication Data

US 2007/0116246 A1 May 24, 2007

(51) Int. Cl.
*H04M 1/64* (2006.01)
*H04M 3/00* (2006.01)
*H04M 1/00* (2006.01)

(52) U.S. Cl. .............................. 379/266.07; 379/88.12; 455/564

(58) Field of Classification Search . 379/266.01–266.1, 379/88.11–88.13; 455/564
See application file for complete search history.

(56) References Cited

U.S. PATENT DOCUMENTS

| | | | |
|---|---|---|---|
| 4,322,581 A | 3/1982 | Christain et al. |
| 5,155,761 A | 10/1992 | Hammond |
| 5,185,782 A | 2/1993 | Srinivasan |
| 5,268,957 A | 12/1993 | Albrecht |
| 5,528,676 A | 6/1996 | Sussell et al. |
| 5,742,674 A | 4/1998 | Jain et al. |
| 5,878,230 A | 3/1999 | Weber et al. |
| 5,923,848 A | 7/1999 | Goodhand et al. |
| 5,933,477 A | 8/1999 | Wu |
| 6,028,922 A | 2/2000 | Deutsch et al. |
| 6,072,867 A | 6/2000 | Lieuwen |
| 6,137,864 A | 10/2000 | Yaker |
| 6,212,553 B1 | 4/2001 | Lee et al. |
| 6,321,093 B1 | 11/2001 | Dalal |

(Continued)

FOREIGN PATENT DOCUMENTS

EP    1 117 245    7/2001

(Continued)

OTHER PUBLICATIONS

U.S. Appl. No. 11/117,247, filed Apr. 27, 2005, Shmuel et al.

(Continued)

*Primary Examiner*—William J Deane
(74) *Attorney, Agent, or Firm*—Marger Johnson & McCollom, P.C.

(57) ABSTRACT

The present invention provides a mechanism for categorizing telephone calls and for providing special information about calls that appear on call lists maintained in a telephone. The invention provides for both providing an indication and for providing an action. When an entry on a call list is highlighted (in a conventional manner), pressing one key adds a flag to the entry on the call list to indicate that follow up action is required. Pressing a second key initiates an action such as attaching a reminder so that the user will be reminded to take action later. Pressing a third key will provide a text message balloon indicating information about the call. The flags and text messages can be added by either the called party or the calling party.

21 Claims, 3 Drawing Sheets

U.S. PATENT DOCUMENTS

Figure 1:

| | | |
|---|---|---|
| 6,327,046 B1 | 12/2001 | Miyamoto et al. |
| 6,405,035 B1 | 6/2002 | Singh |
| 6,427,009 B1 | 7/2002 | Reese |
| 6,438,217 B1 | 8/2002 | Huna |
| 6,501,750 B1 | 12/2002 | Shaffer et al. |
| 6,507,643 B1 | 1/2003 | Groner |
| 6,535,506 B1 | 3/2003 | Narain et al. |
| 6,542,591 B1 | 4/2003 | Amro et al. |
| 6,549,950 B2 | 4/2003 | Lytle et al. |
| 6,601,099 B1 | 7/2003 | Corneliussen |
| 6,614,899 B1 | 9/2003 | Sollee et al. |
| 6,615,236 B2 | 9/2003 | Donovan et al. |
| 6,625,141 B1 | 9/2003 | Glitho et al. |
| 6,636,594 B1 | 10/2003 | Oran |
| 6,658,095 B1 | 12/2003 | Yoakum et al. |
| 6,661,799 B1 | 12/2003 | Molitor |
| 6,665,723 B2 | 12/2003 | Trossen |
| 6,678,735 B1 | 1/2004 | Orton et al. |
| 6,684,147 B2 | 1/2004 | Park et al. |
| 6,711,248 B1 | 3/2004 | Haber et al. |
| 6,721,784 B1 | 4/2004 | Leonard et al. |
| 6,731,625 B1 | 5/2004 | Eastep et al. |
| 6,738,390 B1 | 5/2004 | Xu et al. |
| 6,738,461 B2 | 5/2004 | Trandal et al. |
| 6,754,181 B1 | 6/2004 | Elliott et al. |
| 6,779,020 B1 | 8/2004 | Henrick |
| 6,785,246 B2 | 8/2004 | Foti |
| 6,788,676 B2 | 9/2004 | Partanen et al. |
| 6,799,017 B1 | 9/2004 | Kregel |
| 7,133,504 B2 | 11/2006 | Fostick |
| 7,139,800 B2 | 11/2006 | Bellotti et al. |
| 7,145,998 B1 | 12/2006 | Holder et al. |
| 7,177,404 B2 | 2/2007 | Rosenthal |
| 7,212,614 B1 | 5/2007 | Burg et al |
| 7,266,591 B1 | 9/2007 | Johnston |
| 7,403,770 B2 | 7/2008 | Hayashi |
| 7,480,260 B1 | 1/2009 | Vashisht et al. |
| 2002/0076032 A1 | 6/2002 | Rodriguez et al. |
| 2002/0130791 A1 | 9/2002 | Stumer |
| 2002/0147986 A1 | 10/2002 | Michael et al. |
| 2002/0160757 A1 | 10/2002 | Shavit et al. |
| 2002/0169841 A1 | 11/2002 | Carlson et al. |
| 2002/0186828 A1 | 12/2002 | Bushnell |
| 2003/0018724 A1 | 1/2003 | Mathewson, II et al. |
| 2003/0060198 A1 | 3/2003 | Li |
| 2003/0065628 A1 | 4/2003 | Gargiulo |
| 2003/0081752 A1 | 5/2003 | Trandal et al. |
| 2003/0105827 A1 | 6/2003 | Tan et al. |
| 2003/0148753 A1 | 8/2003 | Pappalardo et al. |
| 2003/0161464 A1 | 8/2003 | Rodriguez et al. |
| 2004/0249890 A1 | 12/2004 | Fellenstein et al. |
| 2005/0143135 A1 | 6/2005 | Brems et al. |
| 2005/0182798 A1 | 8/2005 | Todd et al. |
| 2006/0153347 A1 | 7/2006 | Clark et al. |
| 2006/0159067 A1 | 7/2006 | Chen et al. |
| 2006/0210029 A1 | 9/2006 | Okon |
| 2006/0245567 A1 | 11/2006 | Shaffer et al. |
| 2006/0285661 A1 | 12/2006 | Patel et al. |
| 2007/0015497 A1 | 1/2007 | Patel et al. |
| 2007/0047697 A1* | 3/2007 | Drewry et al. ........... 379/88.13 |
| 2007/0201659 A1 | 8/2007 | Altberg et al. |
| 2008/0095355 A1 | 4/2008 | Mahalaha et al. |
| 2008/0247529 A1 | 10/2008 | Barton et al. |

FOREIGN PATENT DOCUMENTS

| | | |
|---|---|---|
| JP | 11-177616 | 7/1999 |
| WO | 2005/025191 | 3/2005 |

OTHER PUBLICATIONS

U.S. Appl. No. 11/173,052, filed Jul. 1, 2005, Labhesh et al.
U.S. Appl. No. 11/137,049, filed May 25, 2005, Lanhesh et al.
Betsy Yocom, Cherly Molle, Marc Frigo and Michael Hommer, Users gain control of many telephony features, but overall voice-quality still lags, IP-based soft phones, Feb. 25, 2002, pp. 1-8, Network World, www.networkworld.com/reviews/2002/0225rev.htm (Aug. 11, 2005).

* cited by examiner

CATEGORIZATION OF TELEPHONE CALLS

RELATED APPLICATIONS

The present invention is related to the following three prior US patent applications that are commonly owned with the present application. The entire content of the two three prior US patent applications listed below are hereby incorporated herein by reference.
1) Prior application Ser. No. 11/117,247, filed Apr. 27, 2000, entitled "System and Method for Providing a Reverse Camp-On Feature in a Communication Environment."
2) Prior application Ser. No. 11/173,052 filed Jul. 1, 2005, entitled "Method and System for Providing a Contact Attempt Service."
3) Prior application Ser. No. 11/137,049, filed May 25, 2005, entitled "System and method for Associating Due Dates with Messages."

FIELD OF THE INVENTION

The present invention relates to telephony and more particularly to features in telephone systems.

BACKGROUND OF THE INVENTION

Modern telephones and in particular VoIP telephones generally maintain a number of lists that show different types of calls. For example a telephone may maintain a list of "missed calls", a list of "received calls", a list of "outgoing calls", etc.

A typical telephone user receives many different types of telephone calls. All the telephone calls that a typical user receives are not of equal importance. Some telephone calls merely provide information and such messages require no follow-on action. Other messages require some follow-on action. In some situations, the follow-on action involves a "call back" to the calling party. In other situations other types of action are needed.

In order to efficiently use the many features that modern telephones offer, it would be desirable if a telephone provided more information than just a telephone number, about the calls that are in call lists. For example, it would be desirable if a caller could indicate that a particular call is particularly important.

SUMMARY OF THE INVENTION

The present invention provides a mechanism for categorizing the telephone calls and for providing information about calls that appear on call lists. With the present invention various flags can be added to the calls shown on call lists. Furthermore when a call in a call list is selected, various actions can be initiated. Thus, the invention provides for both providing an indication and for providing an action.

Calls can be categorized by pressing particular keys on a telephone handset. When an entry on a call list is highlighted (in a conventional manner), pressing one particular key adds a flag to the entry on the call list to indicate that follow up action is required. Pressing a second key initiates an action such as attaching a reminder to the call so that the user will be reminded to take action later. Pressing a third key will provide a text message balloon that provides information about the call.

Either the calling party or the called party can add an indicator to a call that appears in a called party's missed call list. Furthermore, either the calling party or the called party can associate a text message with a call.

LIST OF FIGURES

Figure 2:
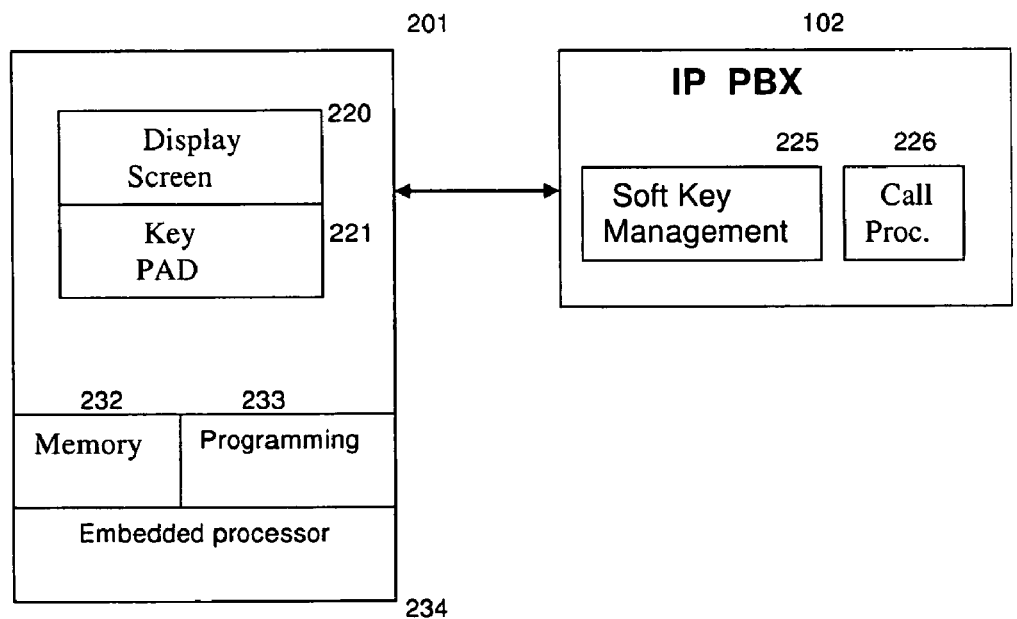
Figure 3:
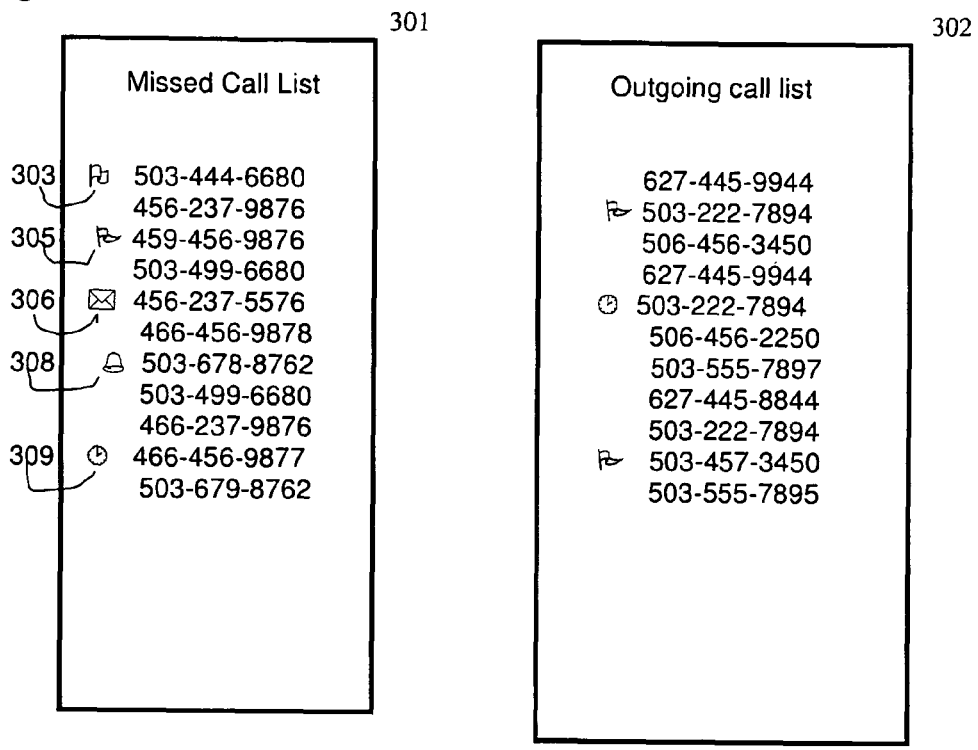
Figure 4:
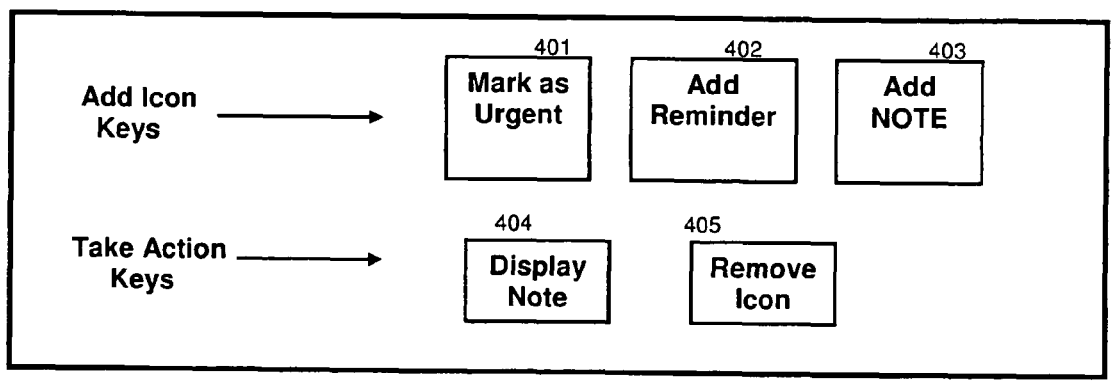
Figure 5:
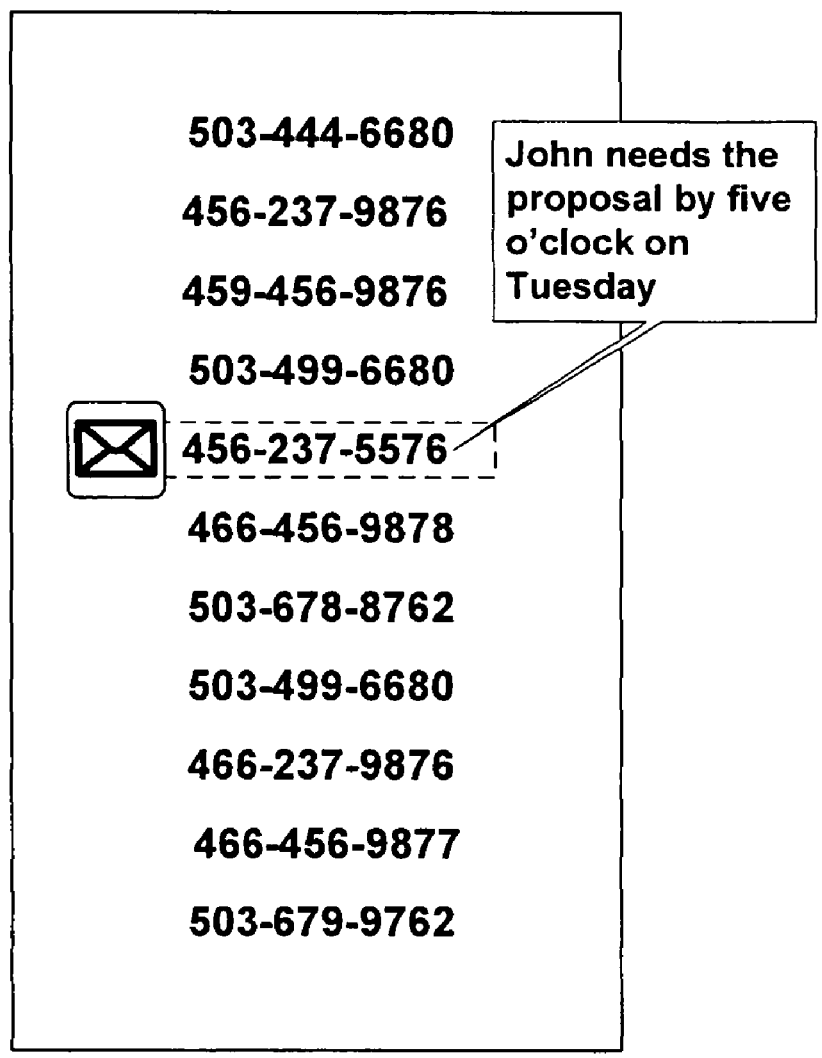

FIG. 1 is an overall system diagram of a first embodiment.
FIG. 2 is a diagram showing an IP telephone connected to an IP-PBX.
FIG. 3 illustrates two call lists with various indicators next to selected calls.
FIG. 4 is more detailed diagram illustrating units in an IP-telephone.
FIG. 5 illustrates a selected number and a balloon providing information.

DETAILED DESCRIPTION

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Each particular reference numeral is used to denote the same element in multiple figures.

Only those parts of the various units are shown and described which are necessary to convey an understanding of the embodiment to those skilled in the art. Those parts and elements not shown are conventional and known in the art.

The present invention can be implemented in many different types of telephone systems. The first specific embodiment described below relates to a Voice over Internet Protocol (VoIP) system. However, it should be understood that the invention can be implemented in almost any type of telephone system.

Thus, while the specific embodiments described below relates to a VoIP system, the present invention is not limited to use in VoIP systems. The present invention is useful in all types of telephone systems, including cellular systems and Plain Old Telephone Systems (POTS systems).

FIG. 1 shows an overall diagram of a first embodiment of the invention as applied to a VoIP telephone system. As indicated in FIG. 1, the system includes two end points 101 and 105 that are respectively connected to IP-PBXs 102 and 104. The IP-PBXs 102 and 104 are in turn interconnected via wide area network 103, which for example, may be the Internet. In FIG. 1, for convenience of illustration, only one IP phone is shown; however, it is noted that typically a relatively large number of IP phones are connected to an IP-PBX. Here only one phone is shown for convenience of illustration and description.

FIG. 2 shows end point 101 and IP-PBX 102 in more detail. End point 101 includes an IP telephone handset 201. Handset 201 includes a conventional key pad 221 and a conventional display 220. The display 220 displays soft-keys and call lists. The soft keys are managed by soft-key management software 225 in IP-PBX 102. The soft key management software 225 is conventional; however, the specific functions provided by the soft keys are not conventional.

The handset 201 includes a memory 232, programming 233 and an embedded processor 234. The processor 234 can execute the programming 233. The handset 201 also includes conventional handset circuitry and programming. Such conventional circuitry and programming will not be described herein. Only the programming and memory relevant to the embodiment of the present invention will be described. The IP-PBX 102 includes call processing software 226 that handles the process of setting up calls that are placed on telephone handset 201. The call processing software is conventional except for the added features described herein.

FIG. 3 illustrates two call lists that are stored in a telephone handset 201. The first list, designated by the reference number 301, is a Missed Call List showing calls that have been missed. The second list, designated 302, is an Outgoing Call List, showing calls that have been placed from this particular telephone. List 301 and 302 are merely meant to be representative of the various types of call lists that can exist in a telephone handset. There could also be various other lists such as for example a "received call list".

As shown in FIG. 3, missed call list 301 and outgoing call list 302 have a number of different symbols next to particular numbers. These symbols have been added next to the various numbers by either the called party or the calling party in a manner that will be explained. It should be noted that the symbols shown are merely exemplary symbols and a wide range of similar symbols or indicators could be used to accomplish the same overall purpose.

Symbols 303 and 305 are flags that indicate that these two calls are particularly important. The two flags have different shapes. Symbol 303 indicates that the call has been "flagged" by the called party. Symbol 305 indicates that the call has been "flagged" by the calling party.

Symbol 306 indicates that there is a text message associated with this call. How this message is entered and displayed will be explained later. Symbols 308 and 309 indicate that reminders have been added to these messages. That is, at some later time a bell will sound to remind the user that some action is necessary. Symbol 308 indicates that the reminder has been added by the calling party. Symbol 309 indicates that the reminder has been added by the called party.

FIG. 5 shows what happens when a user selects a call with the indicator 306. The dotted box around the number in FIG. 5 indicates that the particular entry has been selected and highlighted in a convention manner. Generally this is done using a scrolling key.

When the entry with an indicator 306 is selected, the text information that was previously entered by either the called party or by the calling party appears in a balloon next to the selected number as shown in FIG. 5.

FIG. 4 shows soft keys on display 220. Note the display 220 may also have other soft keys displayed that are not shown in FIG. 4. A user can press the soft keys illustrated in FIG. 4 in order to add icons next to particular telephone numbers. Such a display will appear on the handset of both the calling party and the called party in lists where the particular number is displayed. For example, the number may appear in the calling parties called list and in the called party's missed call list.

The key designated 401, in FIG. 4, allows a user to add an urgent indicator next to a call on a call list. If this key is pressed by a called party, an icon such as icon 303 shown in FIG. 3 will be added to the call. The called party need highlight the number in a call list and then press this key in order to add the icon. If this key is pressed by a calling party on the calling party's handset, the icon 305 will be added next to the number on the called party's missed call list. The icon will also be added next to the number on the calling party's "outgoing call list".

If either the calling party, or the called party, presses key 402 during a call, a reminder will be added to the call. If the calling party adds the reminder, the icon will appear as icon 308, whereas if the called party adds the reminder, the icon will appear as icon 309. In order to add a reminder, the user presses key 402 and then enters a number on the keypad 221. A reminder tone will sound after the number of minutes entered in the keypad.

If either the calling party, or the called party, presses key 403 during a call a note icon 306 will be added to the entry listing the called number. The party need press key 403 and then enter a text note using keypad 221. When an entry with the note icon 306 is highlighted, and key 404 is pressed, the text note that was entered will be displayed as indicated in FIG. 5.

Since entering text using a keypad can be cumbersome, in an alternate embodiment, the text message can be entered using a conventional personal computer (PC). A message entered using a PC can be attached to a call using a Computer Telephony Interface (CTI).

In still another embodiment, the PC itself may act as a telephone device. PCs that act as telephones are commercially available and are frequently called "soft phones". For example Cisco Systems Inc. markets such a device that is called an "IP communicator". With such a soft phone, text messages may be attached to calls that appear in call list using a wide variety of graphical user interfaces.

The call processing software in the IP-PBX 12A can, for example, be a program, marketed by Cisco Systems Inc., and referred to in the literature as the Cisco CallManager. There is a publicly available book: Entitled, "Cisco CallManager Fundamentals: A Cisco AWID Solution": by John Alexander, Chris Pearce, Anne Smith, and Delon Whetten, published by Cisco Press, ISBN: 1587050080, July 2001. The above referenced book describes the Cisco CallManager program.

The server on which the call processing software operates can, for example, be a server such as the Medial Convergence Server (MCS) model 7815-1000, 7825-1133 or 7835-1266 commercially marketed by Cisco Systems.

Icons can be placed next to calls listed on a called party's handset by either the called party or by a calling party. The signals generated by pressing keys 401 to 405, and any text message entered on the callings party's handset are sent to the called party's handset by the protocol that sets up the telephone calls. For example, if the SIP protocol is used, this information can be sent by the SIP protocol. The SIP protocol is described in various publicly available documents including in a document entitled "Engineering task Force's Request for Comments 3261". This document is herby incorporated herein by reference. The document is available form the web site of the "The Internet Engineering Task Force" (under the heading RFC pages and the number 3261).

If the SIP protocol is used, the call setup mechanism is modified to send the desired flags (reminder/follow up) or text information to the called party's device. For example, in case of the SIP protocol the SIP INVITE message can be used to contain this new information to accommodate the flags and/or text message as part of the INVITE message. Alternatively, a new header could be defined that could for example be called "Flags" and which would have tokens. One new token could be the token "flagged". Thus a SIP message would be:

Flags: flagged.

Using the SIP protocol, the information on the lists in the calling party's phone and in the called party's phone can be synchronized. With the present invention, an event package could be used to synchronize the information concerning which calls have been flagged on the calling party's and on the called party's phones.

Similarly, in other protocols such as the protocol known as "Skinny Client Control Protocol" (SCCP), or the ITU-T protocol known as H.323, the corresponding setup and alerting messages would be modified to achieve the same behavior. These changes would be in the systems using these protocols, such as in the Call Manager program and the IP handsets.

It is noted that the programming 233 in handset 201 captures the keystrokes entered by the operator and it initiates the appropriate action. The programming 233 also includes a timer that is set to ring a reminder as required by the reminder icon.

It is noted that while the specific embodiment described here includes a server and call processing software commercially marketed by Cisco Systems Inc., a variety of other servers and call processing software systems are commercially available. Other embodiments of the inventions could utilize various other call processing software systems.

It is noted that different embodiments of the invention are possible with a wide variety of VoIP, Cellular, or POTS telephone systems.

It is noted that herein, the user enters information by pressing the keys 401 to 405 shown in FIG. 4 and by entering text in the key pad 221 shown in FIG. 2. These keys are merely examples of user activated device and the same information entered by pressing these keys could be entered by the operator by activating other user activated devices. The term key is herein used to mean any user activated device that provides a signal to the underlying circuitry or programming.

It is also noted that in the first embodiment described above, the keys which provided for a user to add icons to calls were soft-keys controlled by soft-key management program 225. In other embodiments, these keys can be dedicated keys on the phones keypad.

It is also noted that the above are merely examples of the various preferred embodiments possible with the present invention. Various other embodiments of the present invention are possible. For example, the invention can be applied to a Plain Old Telephone (POTS) system. It will be recognized by those skilled in the art that various changes in form and detail may be made in the above described embodiments without departing from the spirit and scope of the invention.

We claim:

1. A telephone system comprising a handset, the handset comprising:
   an embedded processor;
   a memory for storing a plurality of icons, wherein one of the plurality of icons indicates that a follow up action is required;
   a plurality of keys which can be activated by a user; and
   programming executable by said embedded processor for displaying a call list, for displaying said one of the plurality of icons next to a particular telephone number within the call list when a first one of said plurality of keys is activated to indicate that said follow up action is required with respect to a call associated with the particular telephone number, for attaching a reminder to the call when a second one of said plurality of keys is activated to remind the user to take the follow up action, and for providing a text message balloon when a third one of said plurality of keys is activated to provide text information associated with the particular telephone number.

2. The telephone system recited in claim 1 wherein said telephone system is a VoIP telephone system and wherein said plurality of keys a comprises soft keys.

3. The telephone system recited in claim 1 wherein said reminder indicates that a reminder tone will be sounded at a specified time, said telephone system further comprising a timer that sounds the reminder tone at the specified time, wherein the specified time is entered into the telephone system by the user.

4. The telephone system recited in claim 1 wherein said one of the plurality of icons can be added next to the particular telephone number by either a calling party or a called party.

5. The telephone system recited in claim 1 further comprising a keypad, wherein the user can enter the text information associated with said particular telephone number using said keypad.

6. The telephone system recited in claim 1 further comprising means for transmitting said text information from a calling party to a called party.

7. The telephone system recited in claim 1, wherein said call list comprises at least a Missed Call List.

8. The telephone system recited in claim 1, wherein said call list comprises at least an Outgoing Call List.

9. In a telephone system comprising a calling party having a calling party handset and a called party having a called party handset, a method comprising:
   displaying a list of telephone numbers that represent telephone calls on at least one of said handsets;
   highlighting one of the telephone numbers in said list;
   placing an icon adjacent to said highlighted telephone number to indicate that said highlighted telephone number requires a follow up action responsive to a user pressing a first key on a user activated device; and
   associating a reminder with said highlighted telephone number to remind said user to take said follow up action responsive to said user pressing a second key on said user activated device.

10. The method recited in claim 9 wherein said icon indicates that a text note has been associated with said highlighted telephone number.

11. The method recited in claim 10, wherein said telephone system further comprises a keypad and wherein a user can enter said text note using said keypad.

12. The method recited in claim 10, further comprising providing a text message balloon displaying said text note associated with said highlighted telephone number responsive to said user pressing a third key on said user activated device.

13. The method recited in claim 9 wherein said reminder associated with said highlighted telephone number indicates that a reminder tone will be sounded at a specified time.

14. The method recited in claim 9 wherein either or both of said first key and said second key on said user activated device can be pressed by either the called party or the calling party.

15. The method recited in claim 14 wherein, responsive to the calling party pressing said user activated device, an indication that the calling party pressed said user activated device is sent to the called party's handset.

16. The method recited in claim 9 wherein said telephone system is a voice over Internet protocol (VoIP) telephone system.

17. The method recited in claim 15 wherein the indication is sent to the called party's handset using the SIP protocol.

18. The method recited in claim 9, further comprising removing said icon responsive to said user pressing a third key on said user activated device.

19. In a telephone handset that displays a list of telephone numbers related to telephone calls and includes a user activated device and a keypad, a method comprising:
   highlighting one of the telephone numbers in said list of telephone numbers;

activating the user activated device to indicate that there is a text message associated with said highlighted telephone number;

receiving from said keypad said text message associated with said highlighted telephone number; and providing a text message balloon to display said text message associated with said highlighted telephone number.

20. The method recited in claim 19 wherein there is a called party and a calling party and wherein said text message can be entered by either said called party or said calling party.

21. The method recited in claim 19 wherein said telephone system is a voice over Internet protocol (VoIP) telephone system.

* * * * *

UNITED STATES PATENT AND TRADEMARK OFFICE
CERTIFICATE OF CORRECTION

| | | |
|---|---|---|
| PATENT NO. | : 7,894,597 B2 | Page 1 of 1 |
| APPLICATION NO. | : 11/249840 | |
| DATED | : February 22, 2011 | |
| INVENTOR(S) | : Jennifer Walker et al. | |

It is certified that error appears in the above-identified patent and that said Letters Patent is hereby corrected as shown below:

Column 5, line 64, the words "keys a" should read -- keys --.

Signed and Sealed this
Twenty-eighth Day of February, 2012

David J. Kappos
*Director of the United States Patent and Trademark Office*